United States Patent [19]
Colarik et al.

[11] Patent Number: 4,979,701
[45] Date of Patent: Dec. 25, 1990

[54] AIRCRAFT ARRESTING ELEMENTAL NET WITH MULTIPLE INDEPENDENT BOTTOM HORIZONTAL STRAPS

[75] Inventors: David K. Colarik, Media; Christopher A. Cripe, Coatesville, both of Pa.

[73] Assignee: Patron Inc., Hoffman Estates, Ill.

[21] Appl. No.: 317,690

[22] Filed: Mar. 1, 1989

[51] Int. Cl.$^5$ .............................................. B64C 25/68
[52] U.S. Cl. ............................ 244/110 C; 244/110 R; 114/145 R; 256/23
[58] Field of Search ....................... 244/110 C, 110 R; 114/145 R; 256/23, 1

[56] References Cited

U.S. PATENT DOCUMENTS

| | | | |
|---|---|---|---|
| 3,454,244 | 7/1969 | Walander | 244/110 |
| 3,458,500 | 9/1969 | Carlsson | 244/110 |
| 3,738,599 | 6/1973 | Borehag | 244/110 C |
| 3,810,595 | 5/1974 | Doolittle | 244/110 |
| 3,827,660 | 8/1974 | Doolittle | 244/110 |
| 3,897,920 | 8/1975 | Di Giovanniantonio et al. | 244/110 C |
| 4,143,840 | 3/1979 | Bernard et al. | 244/110 C |
| 4,566,658 | 1/1986 | DiGiovanniantonio | 244/110 |

*Primary Examiner*—Joseph F. Peters, Jr.
*Assistant Examiner*—Chris P. Ellis
*Attorney, Agent, or Firm*—William J. Spatz; T. F. Shields

[57] ABSTRACT

An elemental net for a multiple element aircraft arresting net system. The elemental net has a single upper horizontal strap, several vertical straps having top ends and bottom ends, and at least two lower horizontal straps. The top ends of the vertical straps are directly affixed to the upper horizontal strap at spaced intervals along the upper horizontal strap. The bottom ends of the vertical straps are alternatingly affixed to one of the lower horizontal straps so that the lower horizontal straps are free to move relative to each other to a significant degree and so that lifting of one vertical strap will tend to lift only one of the lower horizontal straps in the vicinity of the vertical strap being lifted. The present invention provides a variable window which is free to expand or contract during aircraft engagement, permitting easier penetration of the net by a greater mix of aircraft. The present invention also ensures that only one lower horizontal strap of the elemental net will seat on the nosewheel strut, while at least one lower horizontal is free to move longitudinally under the nosewheel strut to apply arresting force.

8 Claims, 14 Drawing Sheets

FIG. I
PRIOR ART

AIRCRAFT ARRESTING ELEMENTAL NET WITH MULTIPLE INDEPENDENT BOTTOM HORIZONTAL STRAPS

FIELD OF THE INVENTION

The present invention relates to aircraft arresting nets, and in particular to a new geometry for the webbing of the elemental nets used in a multiple element aircraft arresting net system.

Aircraft arresting nets are generally used as emergency devices to stop a landing aircraft when the aircraft is otherwise unable to stop its forward motion after landing in the amount of space required. Typically, aircraft arresting net systems are constructed of multiple elementary nets. These elementary nets are assembled in groups of, typically, 4, 5, 6, or 7 elementary nets. Several net groups are then arranged to form the multiple element aircraft arresting net system. Each elemental net of the system is typically suspended between a pair of stanchions that are located on either side of an aircraft landing area. The net is perpendicular to the path of the landing aircraft and is released from the stanchions upon engagement of the net by the aircraft. Attaching loops located at the lower ends of the net, nearest the stanchions, connect the net to energy absorbers. These energy absorbers provide the braking force that dissipates the aircraft energy during an arrestment.

Elemental nets are typically fabricated of a strong fabric webbing, such as Nylon. Current technology dictates that a series of vertical straps be attached, at a predetermined regular spacing, between a top horizontal strap and a bottom horizontal strap. Sometimes, the bottom horizontal strap is doubled to increase its breaking strength and provide a greater margin of safety against abrasion. However, where provided, these dual bottom horizontal straps of the prior art are affixed together and thus function as a single strap.

The top horizontal strap of each elemental net is positioned so as to permit the fuselage of the aircraft to travel beneath it, and the lower horizontal strap ideally rests on the runway surface to permit the nose wheel of the aircraft to roll over it unimpeded. The aircraft is thus, ideally, arrested by means of the vertical straps engaging the wings, with the top and bottom horizontal straps being stressed equally on the upper and lower sides of the wings, respectively. In this ideal situation, the forward motion of the aircraft will be smoothly and evenly arrested.

It has been found, however, that frequently when an aircraft engages the elemental net, one of the vertical straps will become entrapped by a pitot tube or other protruberance on the front portion of the aircraft fuselage. When this occurs, the entrapped vertical strap tends to lift the bottom horizontal strap off the runway as the aircraft engages the net. This can cause the portion of the bottom horizontal strap of the elemental net connected to the entrapped vertical strap to be lifted in front of the aircraft nosewheel where it will become caught and exert sufficient force on the nosewheel strut to damage this strut. This is highly undesirable, since a damaged nosewheel strut can lead to extensive damage to or loss of the aircraft.

To prevent damage to the nosewheel strut, the bottom horizontal strap is generally designed to fail before damage to the nosewheel strut would occur. The maximum breaking strength of the bottom horizontal strap, and therefore the arresting force which can be applied by the elemental net is, therefore, limited by the strength of the aircraft nosewheel structure.

Although failure of the bottom strap may prevent or minimize damage to the nosewheel strut, failure of the bottom strap still renders the particular elemental net involved essentially ineffective at arresting the aircraft because the top horizontal strap cannot apply arresting force without the bottom horizontal strap to exert an opposing force on the lower side of the wing.

Furthermore, with net designs of the prior art, the spacing between adjacent vertical straps and the top and bottom horizontal straps form a window of substantially fixed size once these vertical straps are sewn to the top and bottom horizontal straps. Thus, each particular geometry (or window size) is limited to a narrow range of aircraft with which it is compatible.

SUMMARY OF THE INVENTION

The foregoing disadvantages are overcome and other advantages achieved in an elemental net for a multiple element aircraft arresting net in accordance with a preferred embodiment of the present invention. In this preferred embodiment, an elemental net includes a single top horizontal strap having vertical straps affixed at the upper end thereof at spaced intervals along the top horizontal strap. The elemental net includes at least two lower horizontal straps which are free to move substantially independently of each other to a significant degree. The vertical straps extending down from the top horizontal strap are alternatingly connected to one or the other of the horizontal straps so that lifting of one vertical strap due to engagement with the aircraft will lift only one of the bottom horizontal straps in the vicinity of the vertical strap being lifted.

The use of a single top horizontal strap with at least two substantially independent bottom straps gives the elemental net in accordance with the present invention a variable sized "window" (i.e. the space between adjacent vertical staps), because the plurality of bottom horizonal straps are also free to move axially and front to back with respect to each other to a degree limited by attachment of all the vertical straps to a common top horizontal, thus increasing the range (or number) of types of aircraft compatible with a particular net geometry and strap spacing.

Because the lower horizontal straps are substantially independent of each other and the lower ends of the vertical straps alternatingly affixed to one or the other of the bottom horizontal straps, entrapment of a vertical strap with a protruberence will only tend to lift one, but not both, of the bottom horizontal straps into engagement with the nosewheel strut. The other lower horizontal strap remains active and effective to arrest the aircraft. This reduces the probability of damage to engaging aircraft and also improves the arresting efficiency of each net element of the multiple element aircraft arresting net. Consequently, the number of elementary nets required in a net assembly can be reduced while maintaining the same degree of safety.

The above and other objects, features and advantages of the present invention will be apparent from the following detailed description of illustrative embodiments thereof which is to be read in conjunction with the accompanying drawings, wherein:

DETAILED DESCRIPTION

Figure 1:
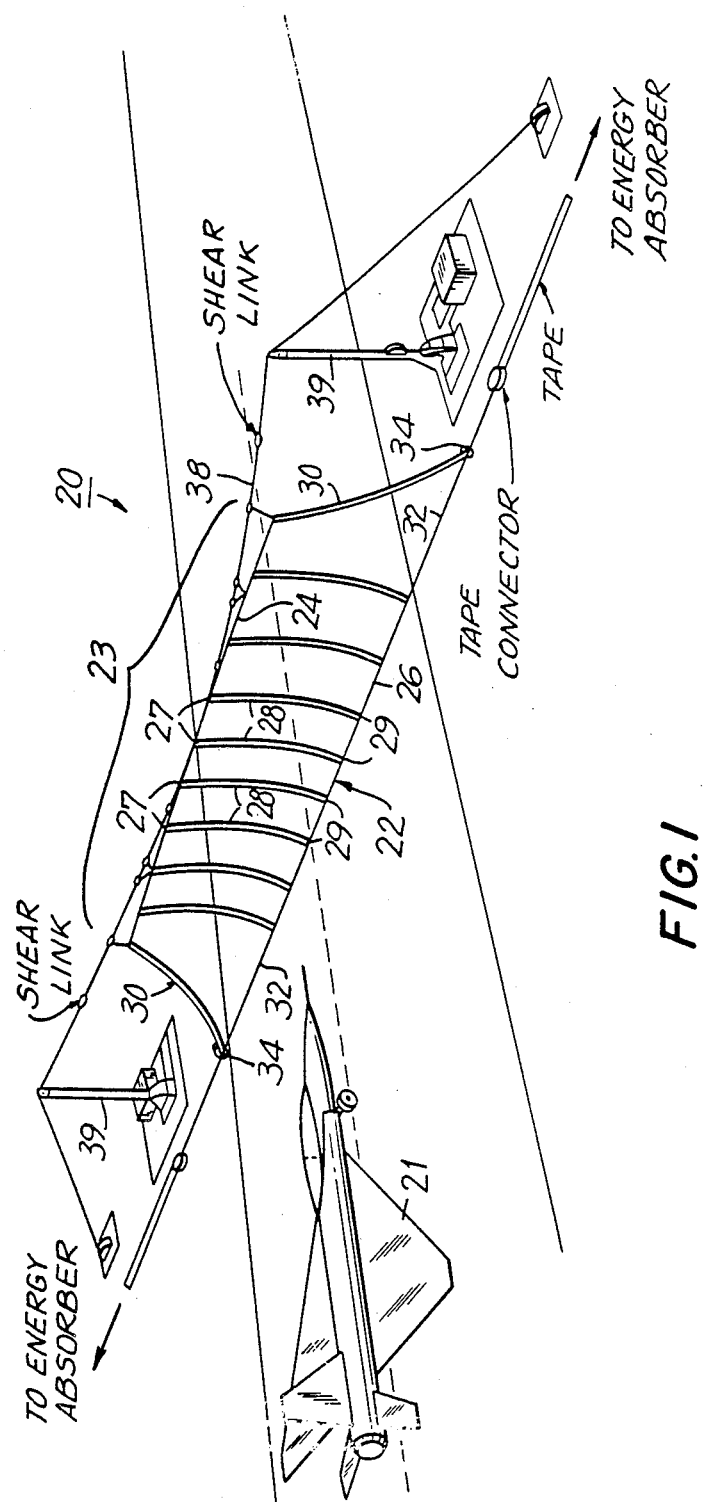
FIG. 1 is a perspective view of a typical single elemental net assembly of the prior art having a single bottom horizontal strap, installed on support stanchions, with the elemental net depicted schematically.

Turning now to the drawings in detail, and initially to FIG. 1 thereof, a typical single elemental net assembly 20 of the prior art is illustrated on a runway with an approaching aircraft 21. Net assembly 20 includes an elemental net 22 having a net region 23 which engages the aircraft to be arrested. Net region 23 comprises an upper horizontal strap 24, a lower horizontal strap 26, and a plurality of vertical straps 28 connected between the upper and lower horizontal straps at locations 27 and 29 at spaced intervals along the lengths of upper and lower horizontal straps, respectively.

Upper and lower connection straps 30 and 32 extend from either side of net region 23 and meet at attachment loops 34. Connection straps 30 and 32 are often continuations of the upper and lower horizontal connection straps, respectively. Attachment loops 34 are, in turn, connected to an energy absorbing device. The upper horizontal strap is maintained above the runway by means of suspension straps 38 located on both sides of the net and extending between stanchions 39. The lower horizontal strap 26 rests on the surface of the runway.

Figure 2:
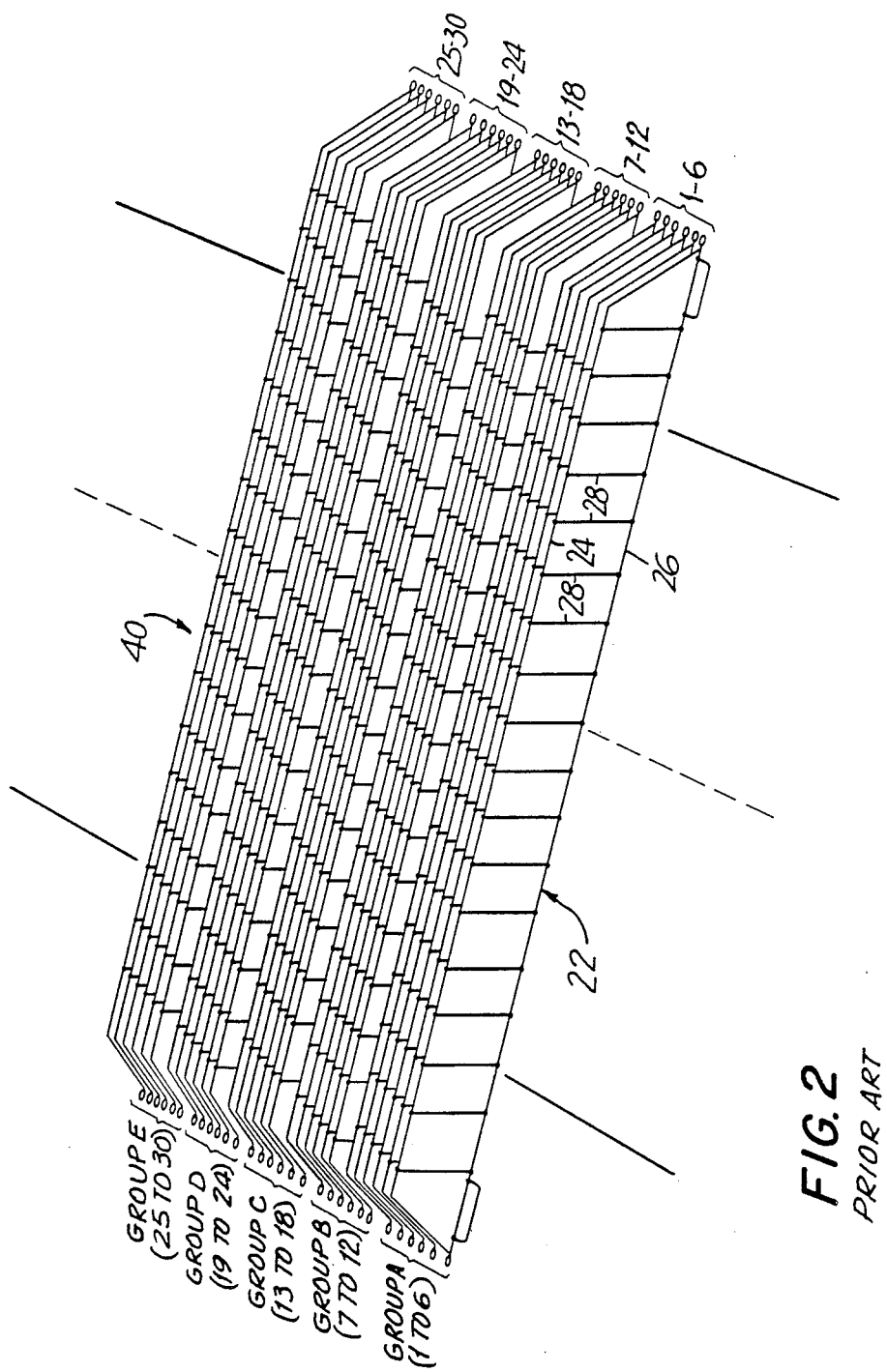
FIG. 2 is a perspective view of a typical multiple elemental net system of the prior art installed across a runway, with the elemental nets depicted schematically.

Turning now to FIG. 2, a typical multiple element net system 40 employing the prior art elemental nets 22 of FIG. 1 is depicted schematically. Net system 40 includes five groups of elemental nets, labeled A-E, each of which has six substantially identical elemental nets 22. For clarity, however, lower horizontal strap 26 and vertical straps 28 are shown in full only for the front elemental net.

Figure 3:
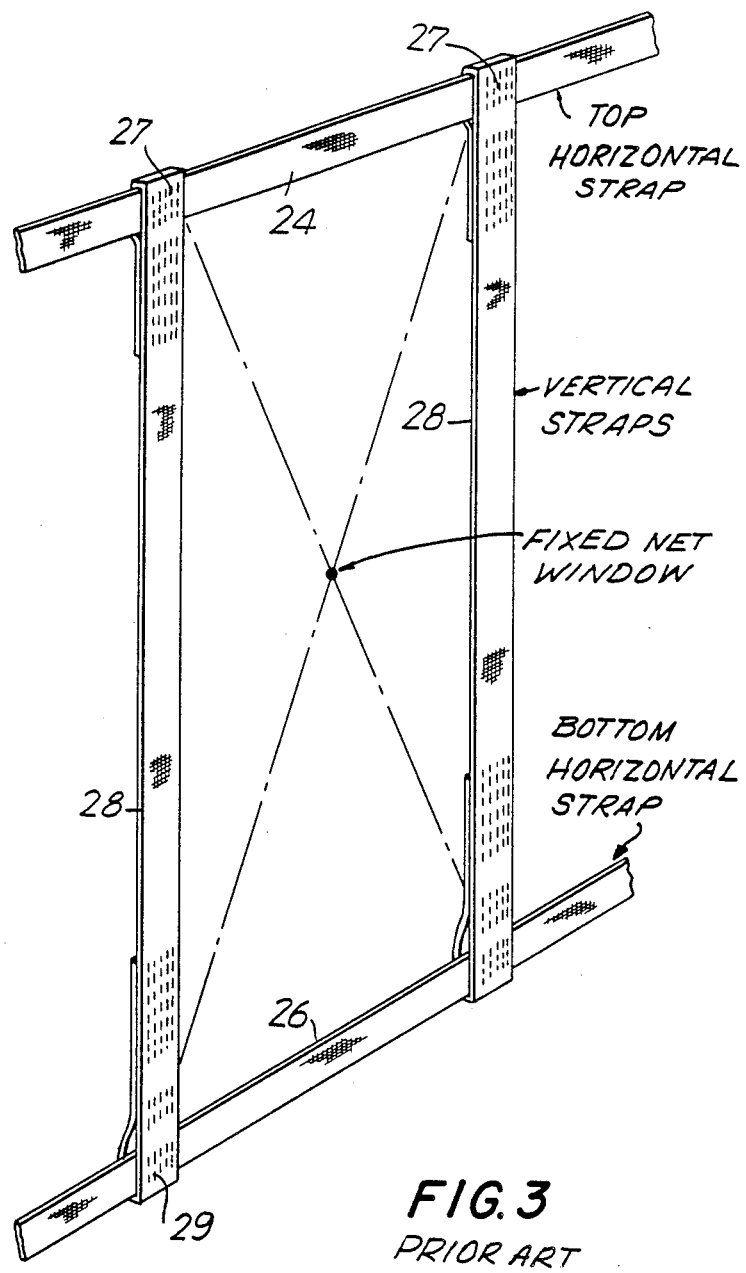
FIG. 3 is perspective view of a single window area of an elemental net of the prior art.
Figure 4:
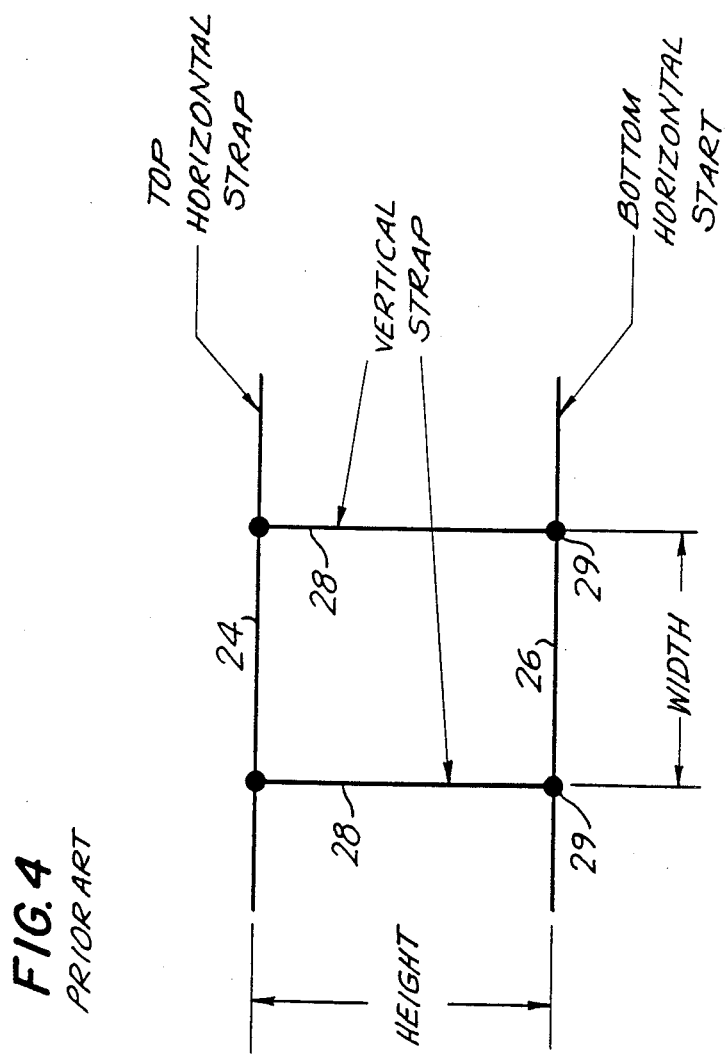
FIG. 4 is a schematic depiction of a single window area of an elemental net of the prior art having a single bottom horizontal strap.

FIGS. 3 and 4 depict a single window area of the net region 23 of elemental net 22, defined by upper horizontal strap 24, lower horizontal strap 26 and two spaced apart vertical straps 28 permanently attached by convenient means such as sewing to upper and lower horizontal straps 24 and 26 at attachment points 27 and 29. The size of the window area is thus substantially fixed, because of the fixed relative locations of attachment points 27 and 29 (schematically depicted as dots in FIG. 4) which have zero degrees of freedom of relative movement.

Figure 5:
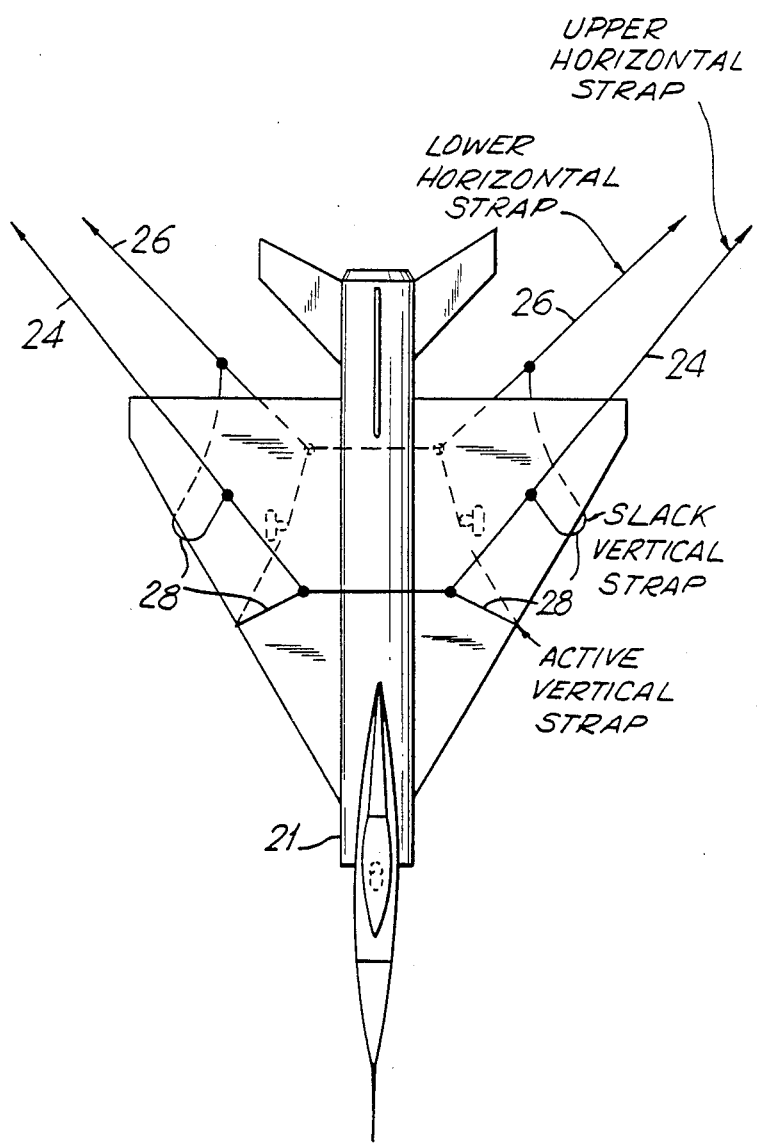
FIG. 5 is a plan view of an aircraft fully engaged in an elemental net of the prior art, shown under ideal conditions without the bottom horizontal strap caught on the nosewheel strut of the aircraft.

FIG. 5 depicts schematically the typical positioning of the straps of prior art elemental net 22 after full engagment of aircraft 21 under ideal conditions, without entrapment of any vertical or horizontal straps. Due to the fixed window area, the vertical straps 28 closest to the fuselage are fully engaged with the wing and fully stressed, but the adjacent vertical straps 28 farther from the wing are slack and unstressed. Thus, all arresting force is applied by means of only two vertical straps acting on the wings.

Figure 6:
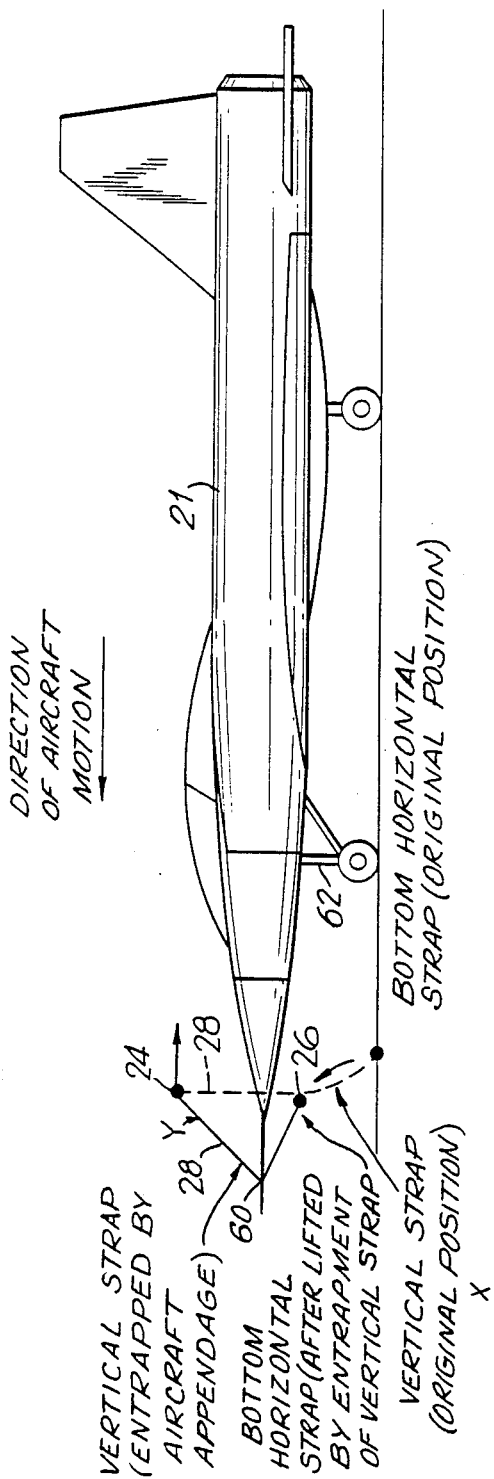
FIG. 6 is an elevational view of an aircraft coming into engagement with an elemental net of the prior art, shown immediately following entanglement of a vertical strap with an appendage on the front portion of the aircraft.

FIG. 6 depicts schematically what typically occurs immediately after engagement of an aircraft with an elemental net 22 of the prior art where one of the vertical straps 28 becomes entrapped by an appendage 60 at the front of the aircraft, such as a pitot tube. As the aircraft engages the net, the entrapped vertical stap is deflected from its original position X shown by the dotted lines to a deflected position Y, shown by the solid lines. Even though very little arresting force is being applied at this point, as strap 28 deflects, it tends to lift lower horizontal strap 26 above the surface of the runway. Once above the surface of the runway, lower horizontal strap 26 may become caught by nosewheel strut as the aircraft passes by.

Figure 7:
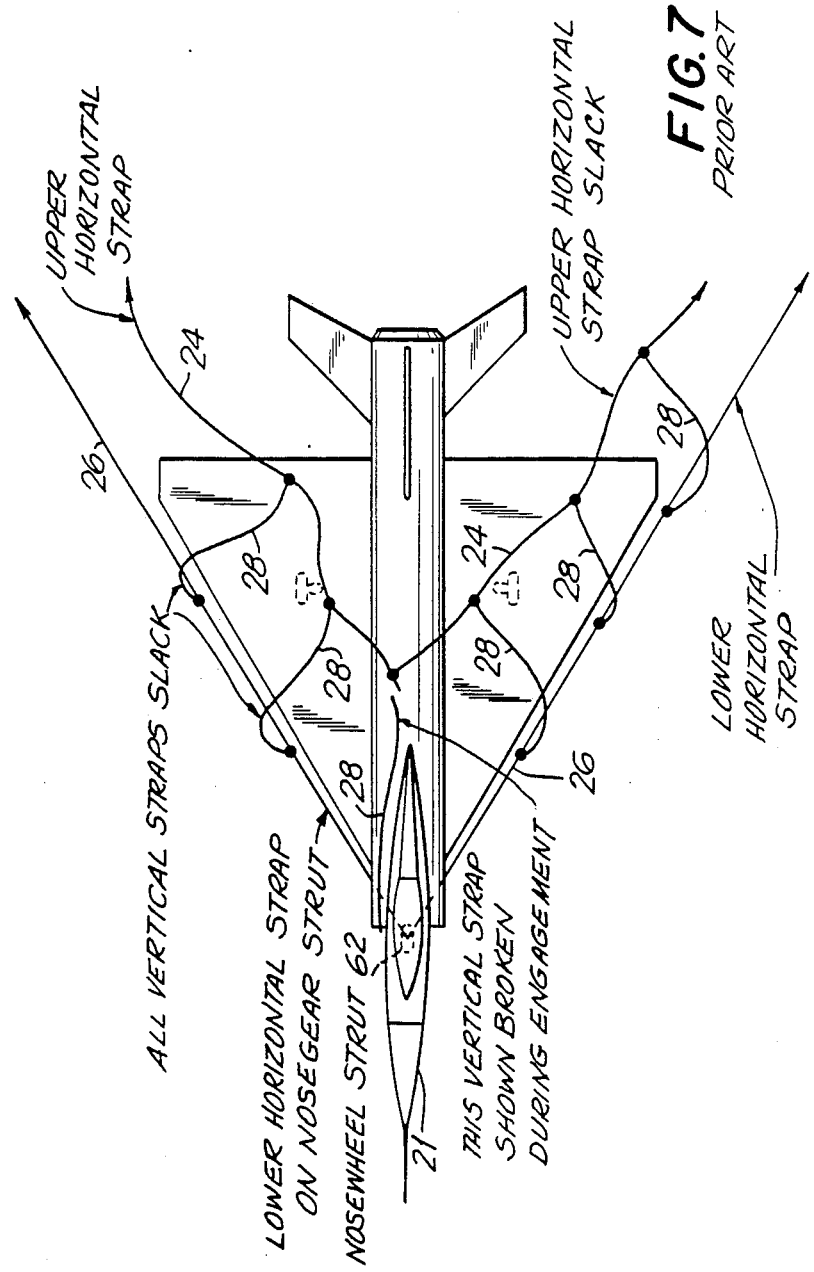
FIG. 7 is a plan view of an aircraft fully engaged in an elemental net of the prior art, shown with the bottom horizontal strap caught on the nosewheel strut of the aircraft.

FIG. 7 depicts schematically in plan view the typical positioning of the straps of elemental net 22 after full engagment of aircraft 21, where bottom horizontal strap has been caught by nosewheel strut 62 due to entrapment of one of the vertical straps upon initial engagement of the aircraft with the net. The central vertical stap has broken, lower horizontal strap 26 is taut about nosewheel strut 62, and upper horizontal strap 24 and the remaining vertical straps 28 are slack. Thus, virtually all the arresting force is being applied by the lower horizontal strap to the nosewheel strut 62 alone. This causes large stresses on the nosewheel strut, which may damage the strut and ultimately result in loss of or serious damage to the aircraft. Accordingly, to prevent such risk of damage to the strut, lower horizontal strap 26 of the prior art is generally designed to fail before damage to the wheel strut occurs. Of course, if lower horizontal strap 26 fails, substantially no arresting force will be applied to the aircraft at all.

Figure 8:
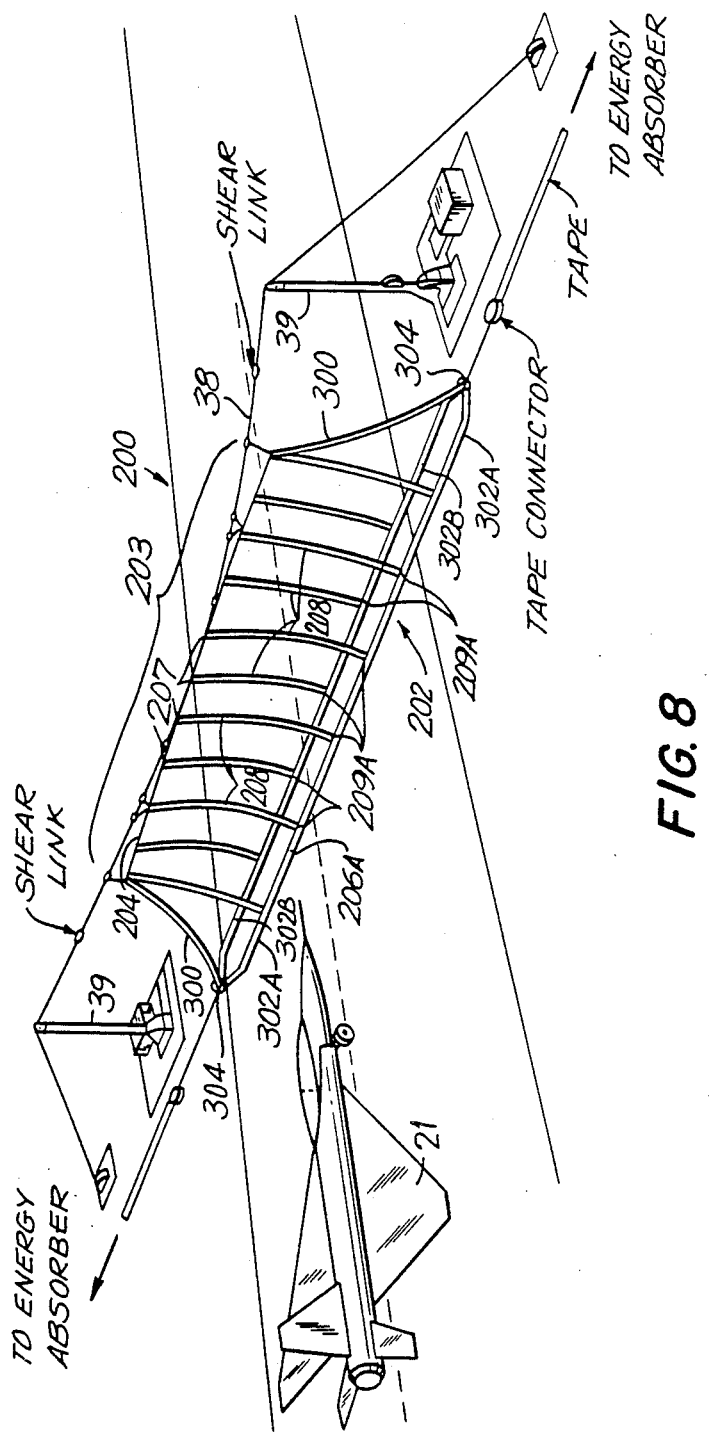
FIG. 8 is a perspective view of a single elemental net assembly in accordance with a preferred embodiment of the present invention having two independent bottom horizontal straps, installed on support stanchions, with the elemental net depicted schematically.

Turning now to FIGS. 8-14, and initially to FIG. 8 thereof, an elemental net assembly 200 including an elemental net 202 constructed in accordance with the present invention is illustrated on a runway with an approaching aircraft 21.

Elemental net 202, in accordance with a preferred embodiment of the present invention, includes a net region 203 comprising a single upper horizontal strap 204 to which a plurality of vertical straps 208 are permanently directly attached at fixed locations 207 spaced at regular intervals along the length of upper horizontal strap 204 by convenient means such as sewing. The spacing between vertical straps depends upon the size of the aircraft to be arrested, but is preferably approximately 2-3 meters. The length of each vertical strap also depends upon the size of the aircraft to be arrested, but is preferably approximately 4-5 meters. These dimensions are in the range of dimensions commonly used for vertical straps 28 of elemental nets 22 of the prior art.

The lower ends of vertical straps 208 are alternating connected to lower horizontal straps 206A and 206B at respective locations 209A and 209B by convenient means, such as sewing. Lower horizontal straps, 206A and 206B are substantially independent from each other and free to move relative to each other to a significant degree in the active region of the net (i.e., where the aircraft is intended to engage the net). Lower horizontal straps 206A and 206B are advantageously connected together beyond the active region of the net at 304, to permit use of a common energy absorber for both straps 206A and 206B. Straps 206A and 206B could also be unconnected at their ends. All the straps are preferably fabricated of a sturdy fabric material such as Nylon. Each of lower horizontal straps 206A and 206B preferably have the same tensile strength as upper horizontal strap 204. Preferably, vertical straps 208 also have the same tensile strength as upper horizontal strap 204.

Figure 9:
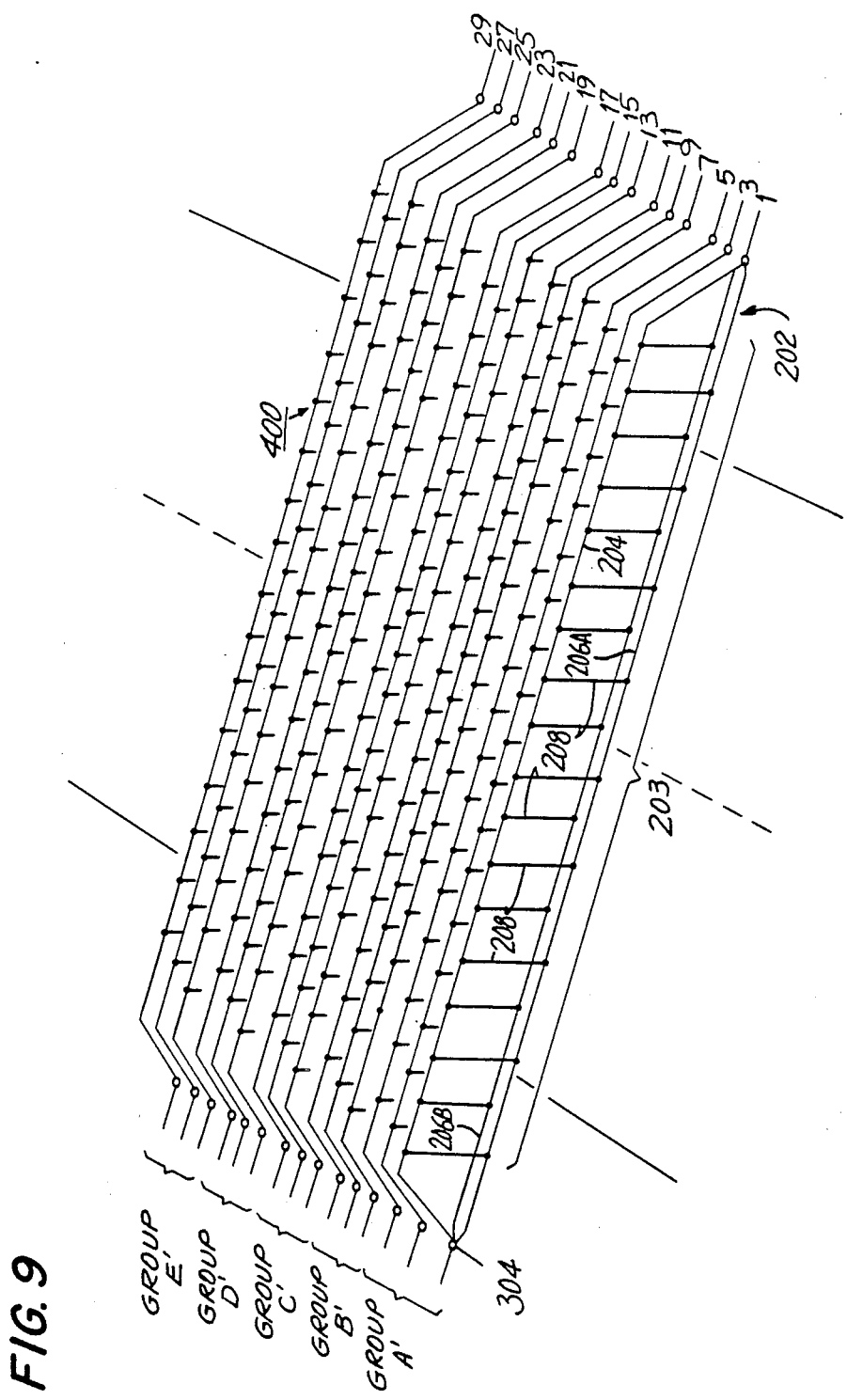
FIG. 9 is a perspective view of a multiple elemental net system employing an elemental net constructed in accordance with a preferred embodiment of the present invention having two independent bottom horizontal straps, installed across a runway, with the elemental nets depicted schematically.

Turning now to FIG. 9, a typical multiple element net system 400 employing the elemental net 202 constructed in accordance with the present invention as depicted in FIG. 8 is illustrated. Like the net system 40 of the prior art depicted in FIG. 2, net system 400 preferably includes five groups of elemental nets, labeled A-E. The number of groups depends of, course, upon the size and type of aircraft to be arrested, and other numbers of groups may be employed. Unlike net system 40 of the prior art, however, each group of elemental nets in net system 400 requires only three elemental nets 202, rather than the six elemental nets 22, for the same arresting efficiency and degree of safety.

Figure 10:
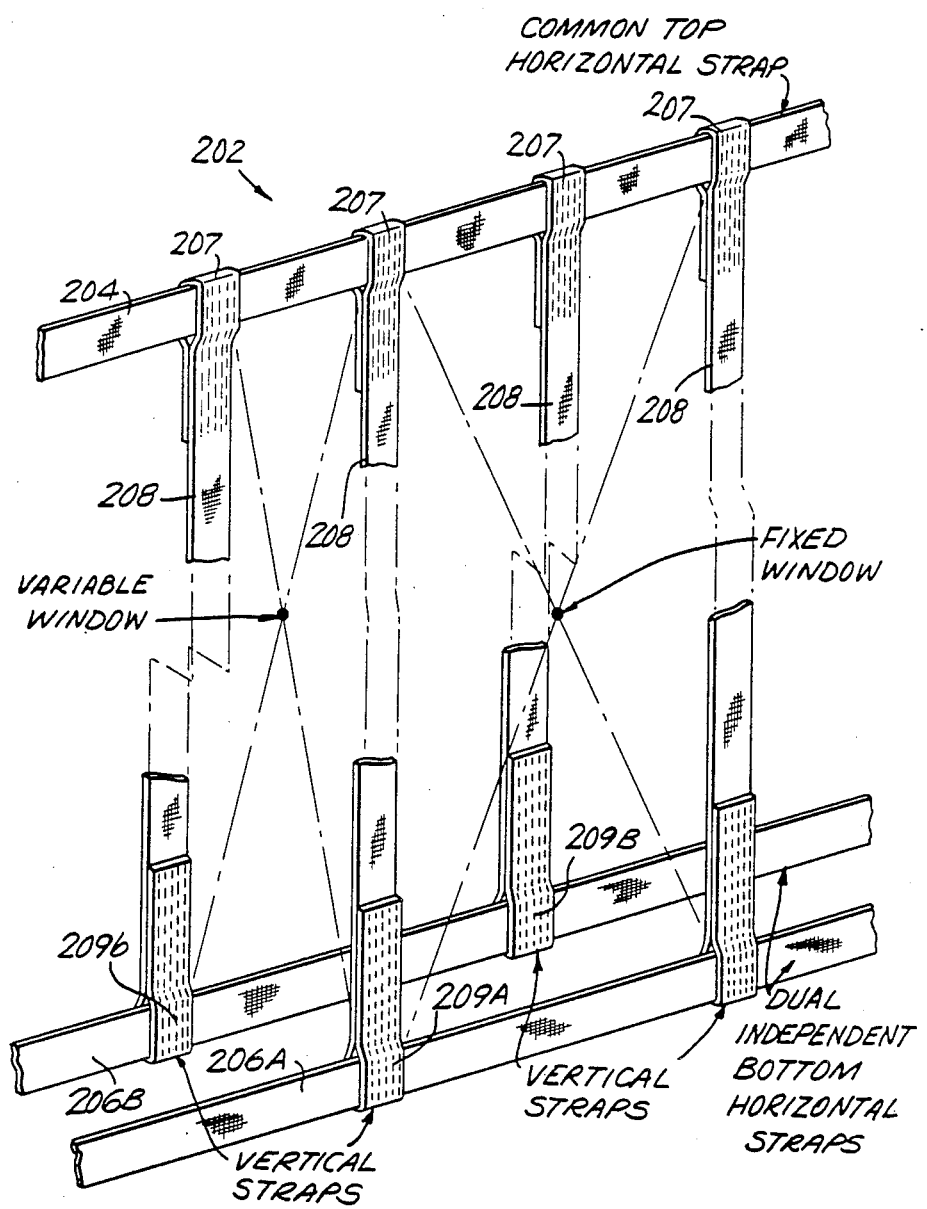
FIG. 10 is a perspective view of a portion of the net region of an elemental net in accordance with a preferred embodiment of the present invention.
Figure 11:
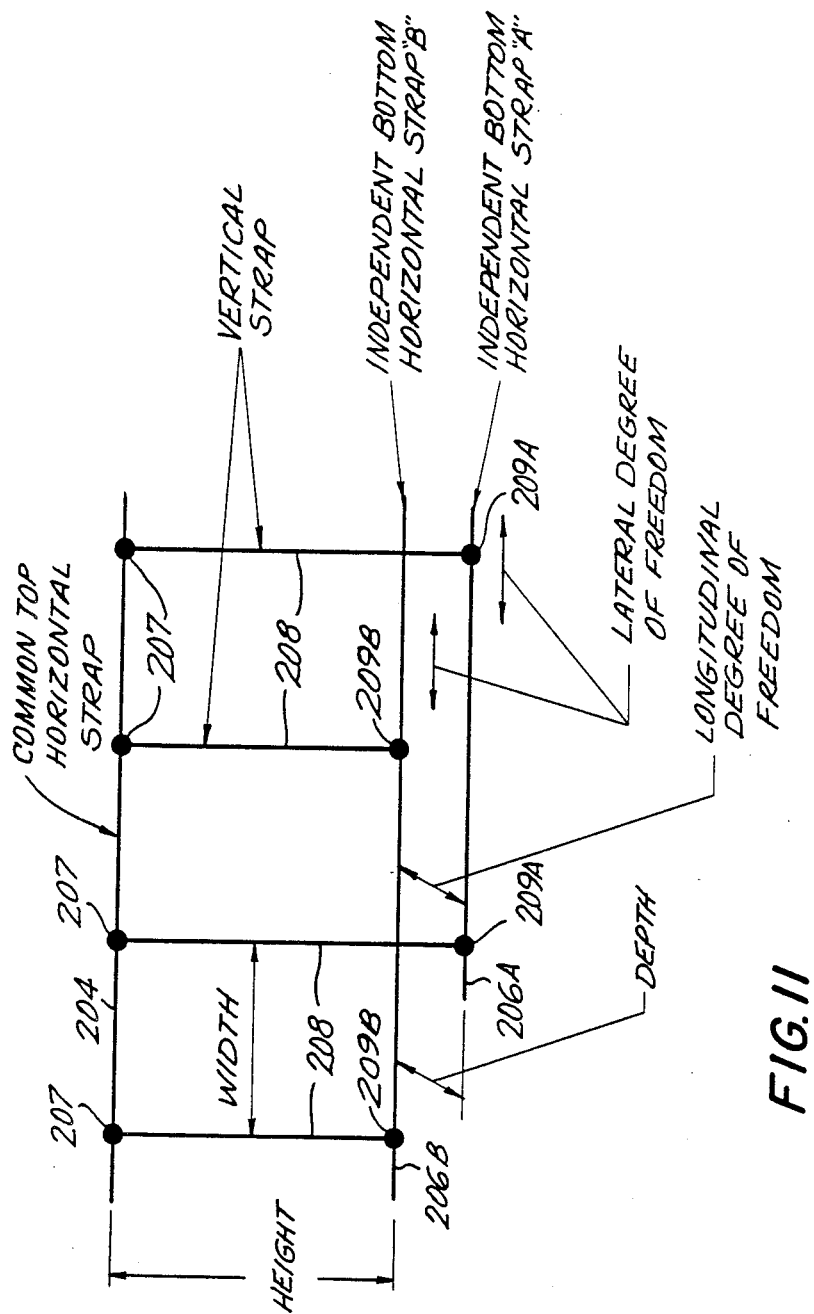
FIG. 11 is a schematic depiction of a portion of an elemental net in accordance with a preferred embodiment of the present invention having a two independent bottom horizontal straps, showing the fixed and variable window areas.

FIGS. 10 and 11 depict a portion of the net region 203 of elemental net 202 of the present invention, showing the fixed window areas and variable window areas. By attaching every vertical strap to the top horizontal strap at a predetermined spacing and then, alternately to only one of the independent bottom horizontal straps, an extra degree of freedom is achieved which permits the variable net window to expand or contract as required during an arrestment, while the fixed window areas defined by alternating vertical straps ensure that full arresting force will be applied to the wings. Thus, one elementary net of the present invention exhibits a similar degree of freedom to two elementary nets constructed in accordance with the prior art. The effect of this variable window area permits more vertical straps to become engaged with the wings of the aircraft during an arrestment, resulting a lower probability of failure of a vertical strap and increased distribution of stresses on the wings.

Figure 12:
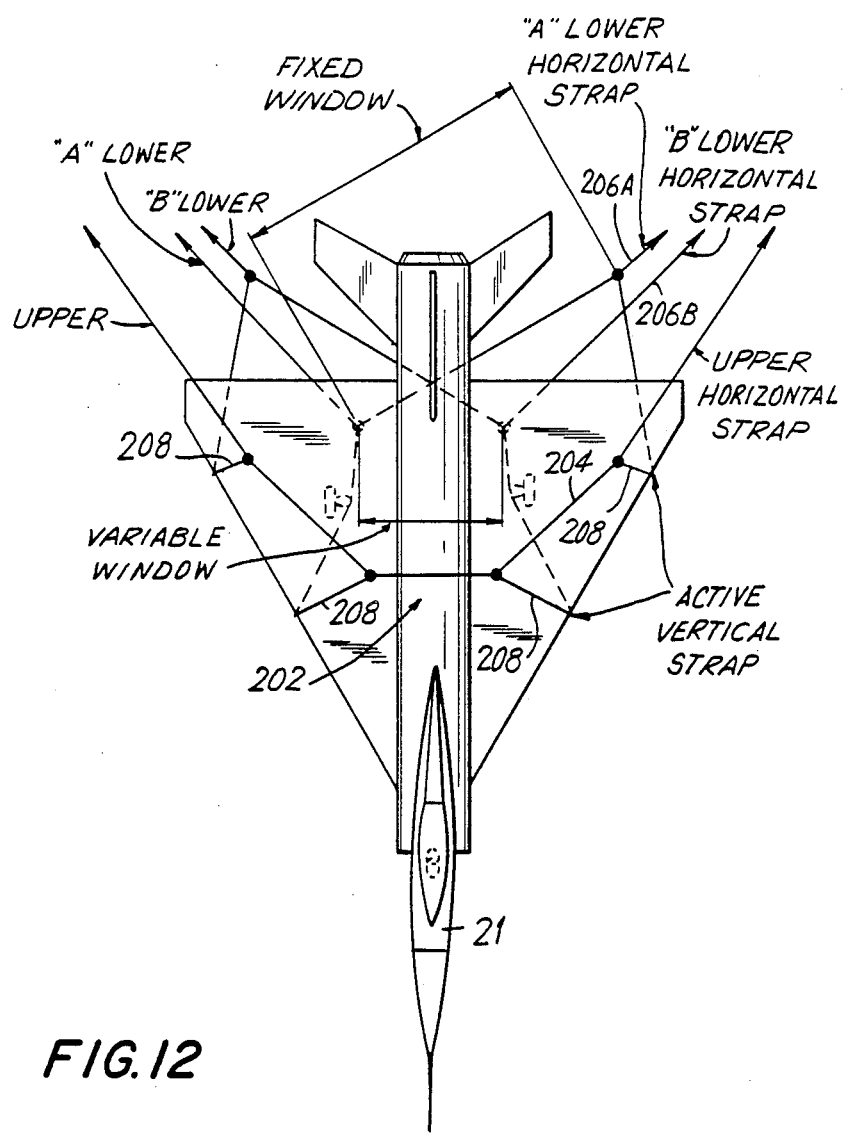
FIG. 12 is a plan view of an aircraft fully engaged in an elemental net in accordance with a preferred embodiment of the present invention, shown under ideal conditions without the bottom horizontal strap caught on the nosewheel strut of the aircraft.

The improved performance resulting from ability of the net of the present invention to expand or contract the variable window area is schematically illustrated in FIG. 12. As depicted therein, an aircraft is fully engaged in elemental net 202 under ideal conditions without the bottom horizontal strap caught on the nosewheel strut of the aircraft. Even though the spacing between the vertical straps is substantially the same as the spacing for the prior art net depicted in FIG. 5, all vertical straps are active and engaged upon the wings with the elemental net of the present invention, whereas in the prior art net depicted in FIG. 5, only two vertical straps engaged under similar conditions.

An important advantage of the elemental net of the present invention is its ability to apply a substantial arresting force to the wings of the engaging aircraft, even in the event of entanglement of one of the vertical straps with a protrusion at the front of the aircraft during engagement.

Figure 13:
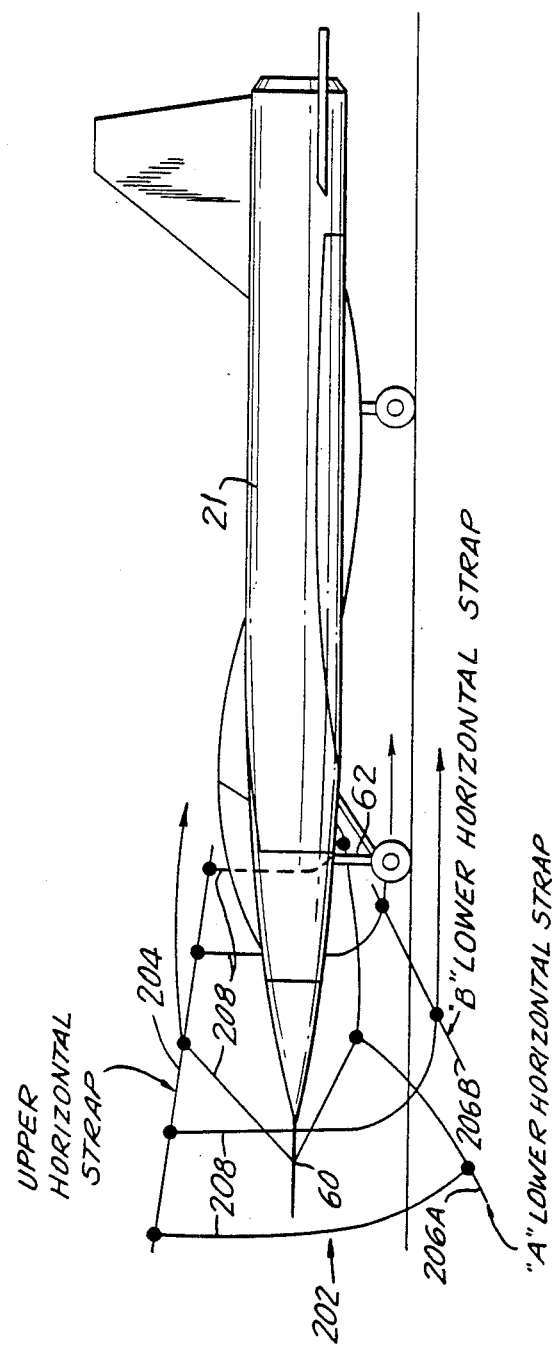
FIG. 13 is an elevational view of an aircraft coming into engagement with an elemental net in accordance with a preferred embodiment of the present invention, shown immediately following entanglement of a vertical strap with an appendage on the front portion of the aircraft.

FIG. 13 depicts schematically what typically occurs immediately after engagement of an aircraft with an elemental net 202 of the present invention where one of the vertical straps 208 becomes entrapped by an appendage 60 at the front of the aircraft, such as a pitot tube. As the aircraft engages the net, the entrapped vertical strap is deflected from its original position on the runway to a deflected position above the surface of the runway. Once above the surface of the runway, lower horizontal strap 206A may become caught by nosewheel strut 62 as the aircraft passes by, in much the same manner as occurs with the prior art net depicted in FIG. 6. However, because in the elemental net of the present invention each vertical strap is attached to only one bottom horizontal strap, entrapment of a pitot tube or other appendage will lift only one horizontal strap in front of the nosewheel structure. The remaining upper horizontal strap 204 and lower horizontal strap 206B are free to engage the aircraft in a normal fashion.

Figure 14:
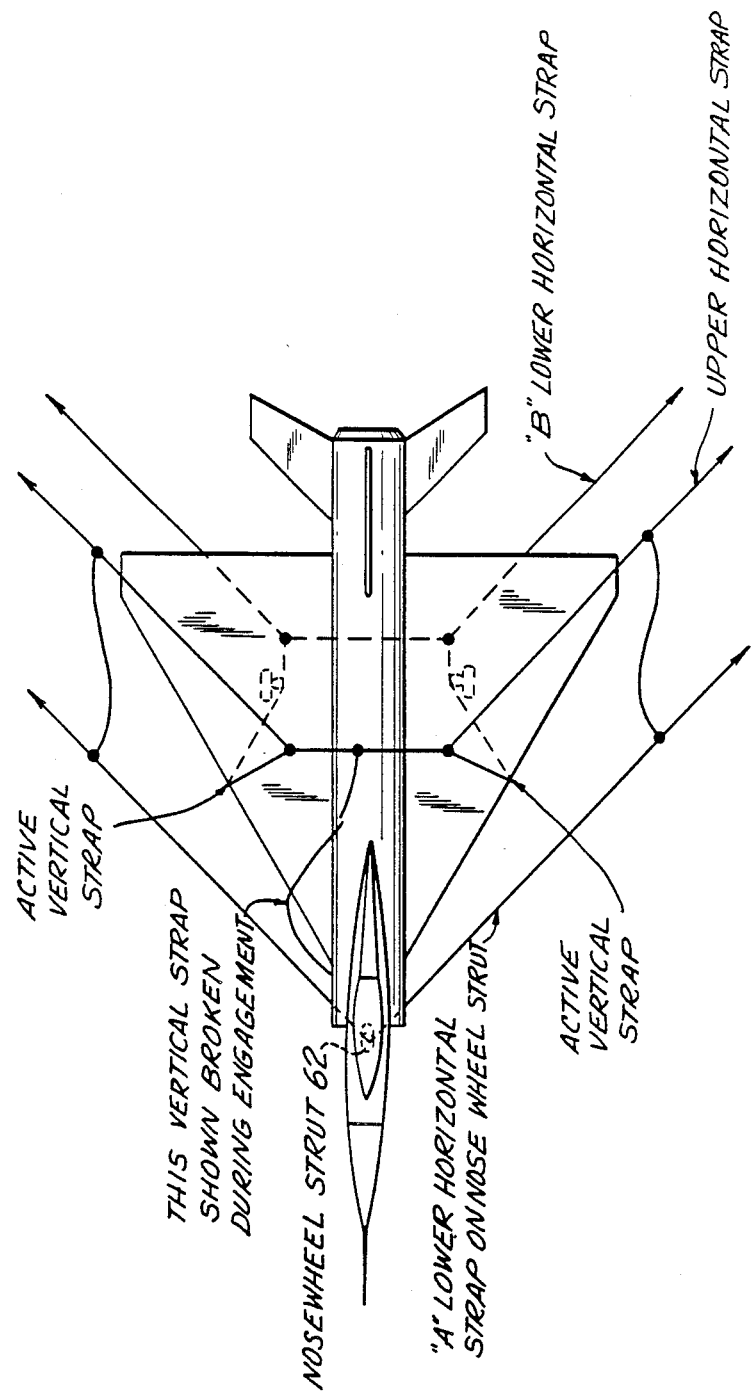
FIG. 14 is a plan view of an aircraft fully engaged in an elemental net in accordance with a preferred embodiment of the present invention, shown with one bottom horizontal strap caught on the nosewheel strut of the aircraft.

FIG. 14 depicts schematically in plan view the typical positioning of the straps of elemental net 202 after full engagment of aircraft 21, where one of the lower horizontal straps (i.e. 206A) has been caught by nosewheel strut 62 due to entrapment of one of the vertical straps upon initial engagement of the aircraft with the net. The central vertical stap has broken, and lower horizontal strap 206A is taut about nosewheel strut 62. Unlike the situation existing under similar conditions with the elemental net of the prior art (as depicted in FIG. 7), however, the other lower horizontal strap 206B is taut, as are upper horizontal strap 204 and two of the remaining vertical straps. Thus, even in the event of entrapment of a vertical strap upon engagement, a substantial portion of the arresting force is applied to the wings. This considerably reduces the proportion of force being applied by the lower horizontal strap 206A to the nosewheel strut 62. This reduces the likelihood of damage to the nosewheel, as well as improving the efficiency of the arrestment.

Because of this, the strength of each horizontal strap can be increased up to a factor of two over prior art designs, without increasing the probability of damage to the nosewheel structure. This allows the number of elementary nets to be reduced by 50% of prior art multiple element net systems, while retaining a similar number of active vertical straps to distribute the arresting load and a similar degree of safety and arresting efficiency. Since there are half as many vertical straps per unit length of net to be unintentionally trapped by an appendage and to lift a bottom horizontal prematurely, the risk of damaging the nosewheel strut is further reduced. Furthermore, if the caught lower horizontal strap 206A fails, subtantially all the arresting force will be applied to the aircraft through the wings. This is not the case with the prior art net technology, which results in loss of the elementary net if this strap fails, thus contributing nothing to the arrestment.

Of course, the elemental net of the present invention is not limited to only two bottom horizontal straps. Any number of multiple independent bottom horizontals may be employed, all connected to a single top horizontal. Where more than two bottom horizontal straps are employed, the vertical straps should be sequentially attached to the independent bottom horizontal straps. However, a variety of other patterns of attachment could also be employed providing that adjacent vertical straps are not affixed to the same bottom horizontal strap of the elemental net.

EXAMPLES

Tests conducted on elemental nets constructed in accordance with the present invention with a wide variety of aircraft, including the F-16, F-15, F-106, A-4, MIG-25 and MIR-III, verify that in all cases, even though a bottom horizontal engaged the nosewheel, several verticals still engaged the wings and the top horizontal engaged the aircraft in a desired configuration. Loss of a lower horizontal strap was found to result in a loss of only ⅓ of that elemental net's contribution to the arrestment. This is also the case if a lower horizontal fails during any other event during the arrestment. Only this lower horizontal is lost, but the other lower horizontal and the top horizontal remain active. Model testing of the MIR-III revealed four (4) active verticals per element versus two (2) with the prior art. Further testing of the elemental net constructed in accordance with the present invention has revealed similar results with most aircraft.

As can be seen, an elemental net constructed in accordance with the present invention exhibits greatly improved characteristics over elemental nets of the prior art, decreasing risk of damage to aircraft, as well as reducing the number of elemental nets required for the complete system at the same arresting efficiency and degree of safety, and thus resulting in a lower cost system with improved performance.

The terms and expressions which have been employed herein are used as terms of description and not of limitation, and there is no intention in the use of such terms and expressions of excluding any equivalents of the features shown and described or portions thereof. Although illustrative embodiments of the present invention have been descibed herein with reference to the accompanying drawings, it is to be understood that various changes and modifications can be effected therein without departing from the scope or spirit of the invention, and there is no intention of limiting the invention to only the preferred embodiment shown and descibed herein. Rather, the scope of the present invention is to be defined by the appended claims.

What is claimed is:

1. An elemental net for a multiple element aircraft arresting net system comprising a single upper horizontal strap, a plurality of vertical straps having top ends and bottom ends, and a plurality of lower horizontal straps, said top ends of said vertical straps being directly affixed to said top horizontal strap at spaced intervals along the upper horizontal strap, alternating bottom ends of said vertical straps being alternatingly affixed to one of said lower horizontal straps so that said lower horizontal straps are free to move relative to each other to a significant degree in the active region of the net and so that lifting of one vertical strap will tend to lift only one of the lower horizontal straps in the vicinity of the vertical strap being lifted.

2. The elemental net defined in claim 1, wherein there are only two lower horizontal straps.

3. The elemental net defined in claim 1, wherein said upper horizontal strap and said lower horizontal straps have substantially the same tensile strength.

4. The elemental net defined in claim 3, wherein said vertical straps have substantially the same tensile strength as said upper horizontal strap and said lower horizontal straps.

5. A multiple element aircraft arresting net system comprising a plurality of elemental nets, each of said elemental nets comprising a single upper horizontal strap, a plurality of vertical straps having top ends and bottom ends, and a plurality of lower horizontal straps, said top ends of said vertical straps being directly affixed to said top horizontal strap at spaced intervals along the upper horizontal strap, alternating bottom ends of said vertical straps being alternatingly affixed to one of said lower horizontal straps so that said lower horizontal straps are free to move relative to each other to a significant degree in the active region of the net and so that lifting of one vertical strap will tend to lift only one of the lower horizontal straps in the vicinity of the vertical strap being lifted.

6. The multiple elemental aircraft arresting net system defined in claim 5, wherein at least some of said elemental nets include only two lower horizontal straps.

7. The multiple elemental aircraft arresting net system defined in claim 5, wherein the upper horizontal strap and said lower horizontal straps of at least some of said elemental nets have subtantially the same tensile strength.

8. The elemental net defined in claim 7, wherein said vertical straps, said upper horizontal strap and said lower horizontal straps of each of said elemental nets have substantially the same tensile strength.

* * * * *

UNITED STATES PATENT AND TRADEMARK OFFICE
CERTIFICATE OF CORRECTION

PATENT NO. : 4,979,701
DATED : December 25, 1990
INVENTOR(S) : David K. Colarik, et. al.

It is certified that error appears in the above-identified patent and that said Letters Patent is hereby corrected as shown below:

On the title page item (73) Assignee:

should be corrected by substituting -- Datron -- for "Patron".

Signed and Sealed this

Twenty-eighth Day of April, 1992

Attest:

HARRY F. MANBECK, JR.

*Attesting Officer*      *Commissioner of Patents and Trademarks*